UNITED STATES PATENT OFFICE.

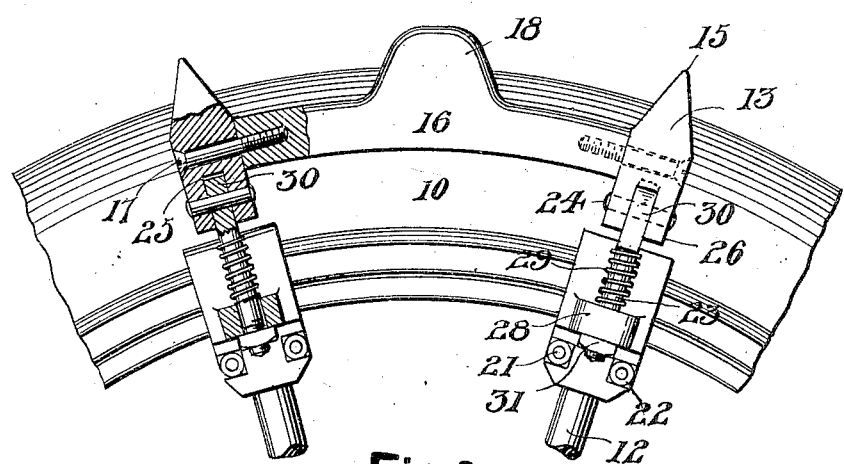
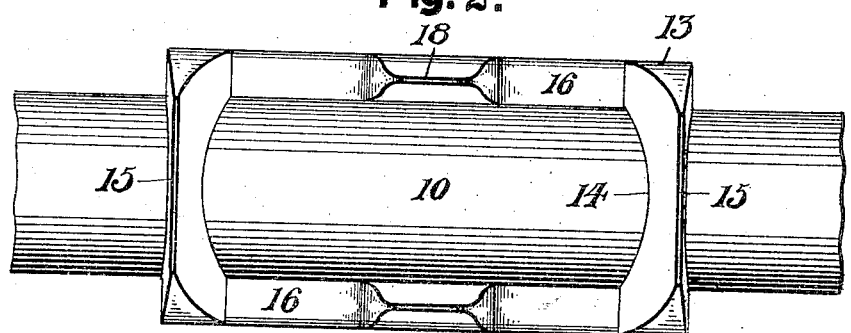
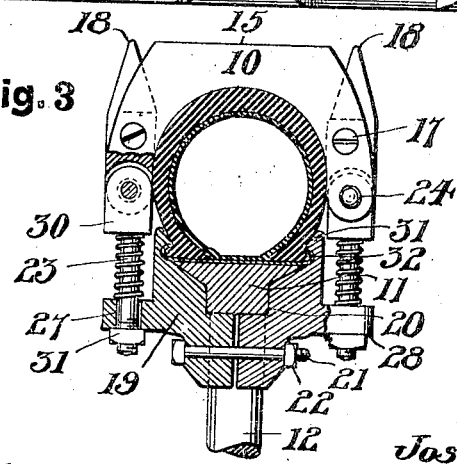

JOSEPH KOPECZKY, OF RACINE, WISCONSIN.

NON-SKID DEVICE.

1,111,072.  Specification of Letters Patent.  Patented Sept. 22, 1914.

Application filed April 2, 1914. Serial No. 829,024.

*To all whom it may concern:*

Be it known that I, JOSEPH KOPECZKY, a subject of the King of Hungary, residing at Racine, in the county of Racine and State of Wisconsin, have invented certain new and useful Improvements in Non-Skid Devices, of which the following is a specification.

This invention relates to new and useful improvements in non-skid devices.

The primary object of this invention is to provide a non-skid link adapted for ready attachment to the tread surface of a vehicle tire for the prevention of side slipping and skidding.

A further object of the device is to provide a non-skid link having spaced tread spanning ridges connected by calk members spaced apart and positioned at opposite sides of the tire tread.

A still further object is to provide a non-skid link inclosing a portion of a vehicle tire and being removably attached to the wheel spokes by a resilient mounting means.

With these general objects in view and others that will appear as the nature of the invention is better understood, the same consists in the novel combination and arrangement of parts hereinafter fully described, illustrated in the accompanying drawings and pointed out in the appended claims.

In the drawings forming a part of this application and in which like designating characters refer to corresponding parts throughout the several views:—Figure 1 is a side view of the device partly broken away and mounted upon a section of an automobile wheel. Fig. 2 is a top plan view thereof, and Fig. 3 is a transverse sectional view thereof with parts of the device in side elevation.

Referring more in detail to the drawings, the non-skid link is herein illustrated as mounted upon the ordinary construction of automobile wheel consisting of the pneumatic tire 10 mounted upon a felly 11, the spokes of the wheel being indicated at 12. While only one of said links is herein illustrated, it will be evident that any desired number of the same may be employed. The link primarily consists of end bars 13 of general arch shape having their inner concaved faces 14 adapted for seating over the tread portion of the tire and with their outer surfaces formed into ribs 15 substantially V-shaped in cross section and positioned outwardly of the tread portions of the tire.

Side connecting bars 16 are spaced apart sufficiently to seat upon opposite sides of the tire and are secured by means of the screws 17 between the end bars 13. Said side bars are provided with outwardly projecting ribs 18 which are sharpened and formed substantially V-shaped in cross section and arranged substantially midway of the ends of said side bars.

It is designed to secure the link to two adjacent ones of the spoke 12 by means of blocks 19 having inner faces 20 adapted to fit around the wheel felly and also adapted to inclose a spoke between each pair of blocks, which blocks are removably secured in such contacting positions with the felly and spokes by means of bolts 21 and lock nuts 22 mounted thereon. Swinging rods 23 are pivoted upon pins 24 secured within slots 25 upon the depending ends 26 of each of the end bars 13 of the link, while such pivoted rods are slidably positioned through perforations 27 in the outwardly projecting lugs 28 of the said blocks 19. Helical springs 29 are positioned upon the rods 23 and resiliently mount the end bars 13 upon said lugs 28 through the engagement of said springs 29 so positioned between the lugs 28 and the heads 30 of the swinging rods while turn nuts 31 are screw-threaded upon the lower ends of said swinging rods for limiting the outward movement of said rods.

It being noted that the bolts 21 firmly secure the blocks 19 upon the spokes and felly, it is also to be understood that a hooked upper flange 31 is provided upon each of said blocks adapted to seat over and engage the projecting wheel rim 32 and by which arrangement it will be seen that the blocks 19 form a stationary base for resiliently mounting the link thereon.

The complete operation of the device will be apparent from this description in that the same is readily applied to a wheel when the turn nuts 22 and bolts 21 are removed and, through the agency of said bolts and nuts, the device may be quickly attached to and detached from any form of vehicle wheel. When in position, the depressing of the tire upon the road-way resiliently positions the four ribs 15 and 18 of the link upon said road-way allowing the supporting springs 29 thereon to be compressed and thus moving the rods 23 inwardly while the said ribs prevent any side slipping or skidding of the wheel. It may be also noted that the side bars 16 may be replaced by new bars at any time desired through the agency of the screws 17.

While the forms of the invention herein shown and described are what are believed to be preferable embodiments thereof, it is nevertheless to be understood that minor changes may be made in the form, proportion and details of construction without departing from the spirit and scope of the invention as set forth in the appended claims.

What is claimed as new is:—

1. A device of the class described comprising block members rigidly secured to the wheel felly and having projecting perforated lugs, arch-shaped end bars adapted to seat upon the tread portion of a tire and having outwardly projecting ribs, connecting bars between said end bars at opposite sides of the tire and having outwardly projecting ribs, swinging rods upon said end bars positioned through the perforations of said lugs and cushioning springs upon said rods and seated upon said lugs.

2. A device of the class described comprising arch-shaped end bars adapted to seat upon a tire and having outwardly projecting transversely positioned ribs, removable side bars secured between said end bars and positionable upon opposite sides of the tire and having outwardly projecting longitudinally positioned ribs, said end bars having inward projections at each end thereof and provided with slots in said projections, swinging rods having heads pivoted in said slots, blocks having inner faces adapted to engage the wheel rim, felly and spokes, locking means for said blocks, outwardly projecting lugs carried by said blocks and having projections therethrough, said rods slidably positioned through the perforations of said lugs and encircling springs upon said rods seated between the ends of said rods and the outer faces of said lugs.

In testimony whereof I affix my signature in presence of two witnesses.

JOSEPH KOPECZKY.

Witnesses:
  MIKE SEGAT,
  JOS. DANGO,